UNITED STATES PATENT OFFICE.

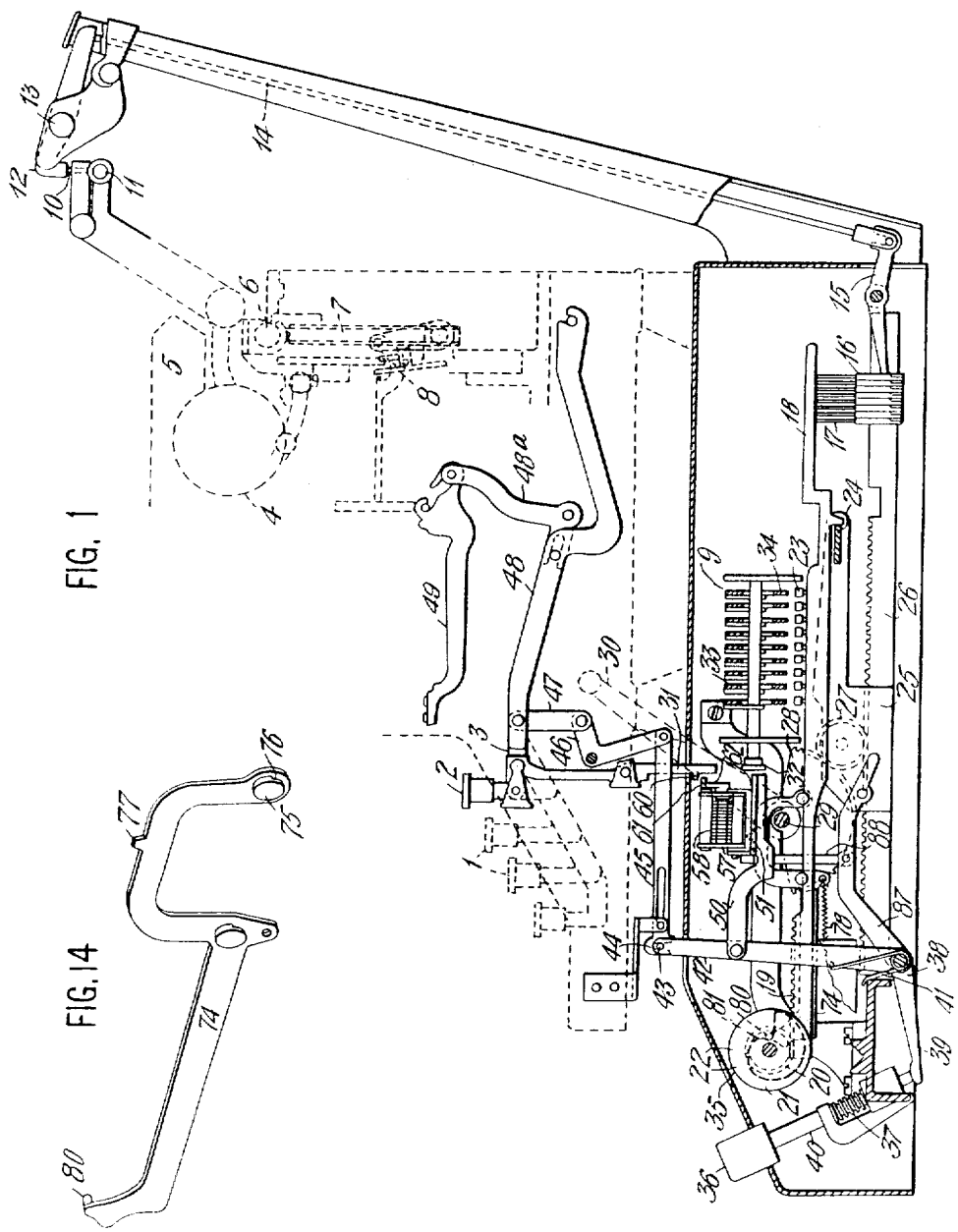

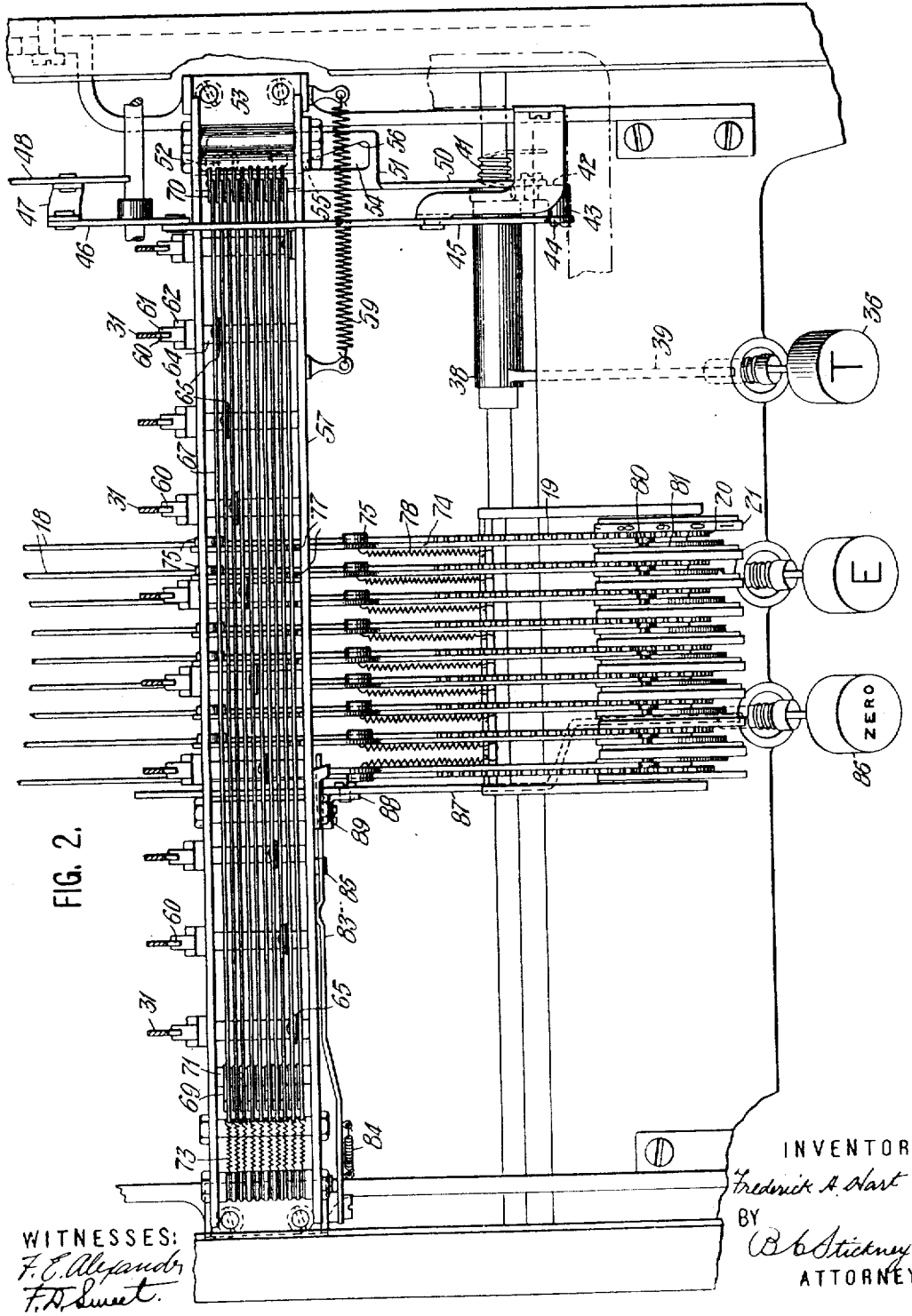

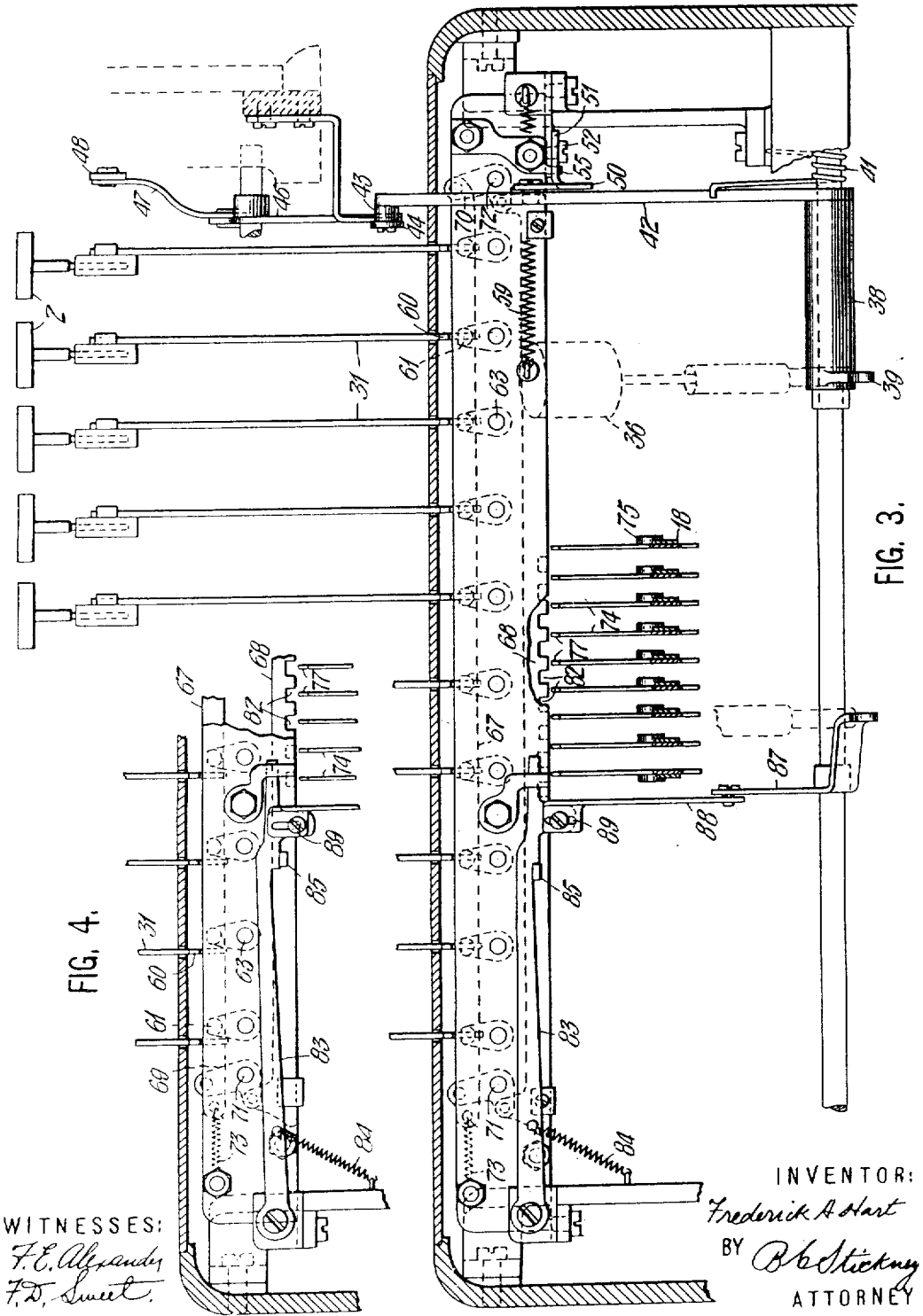

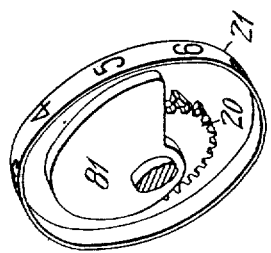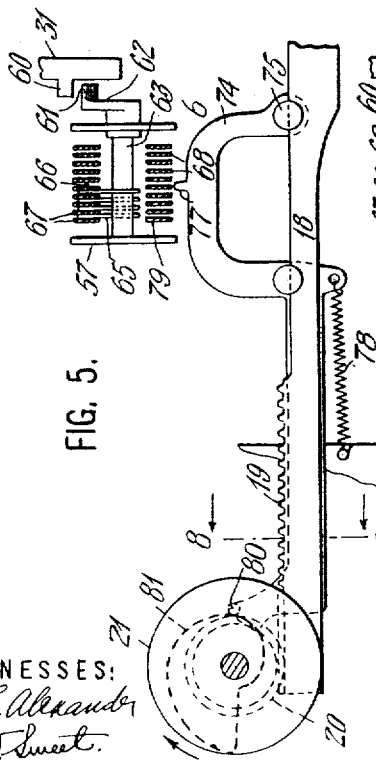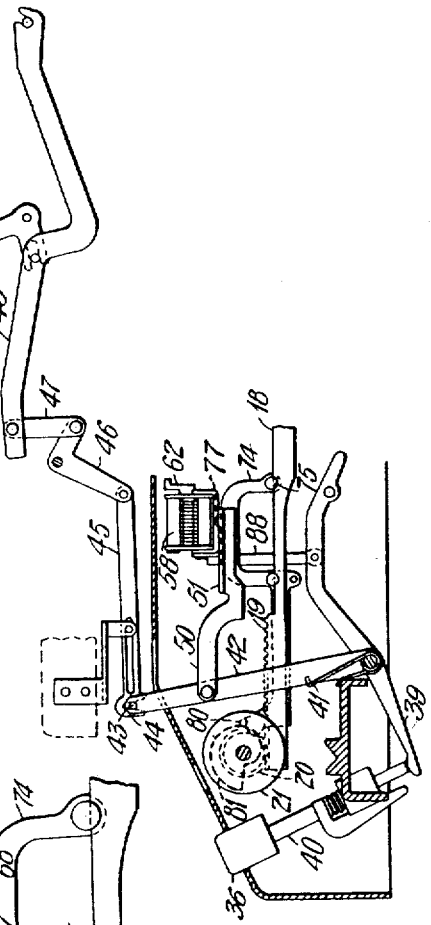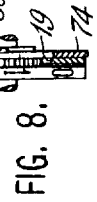

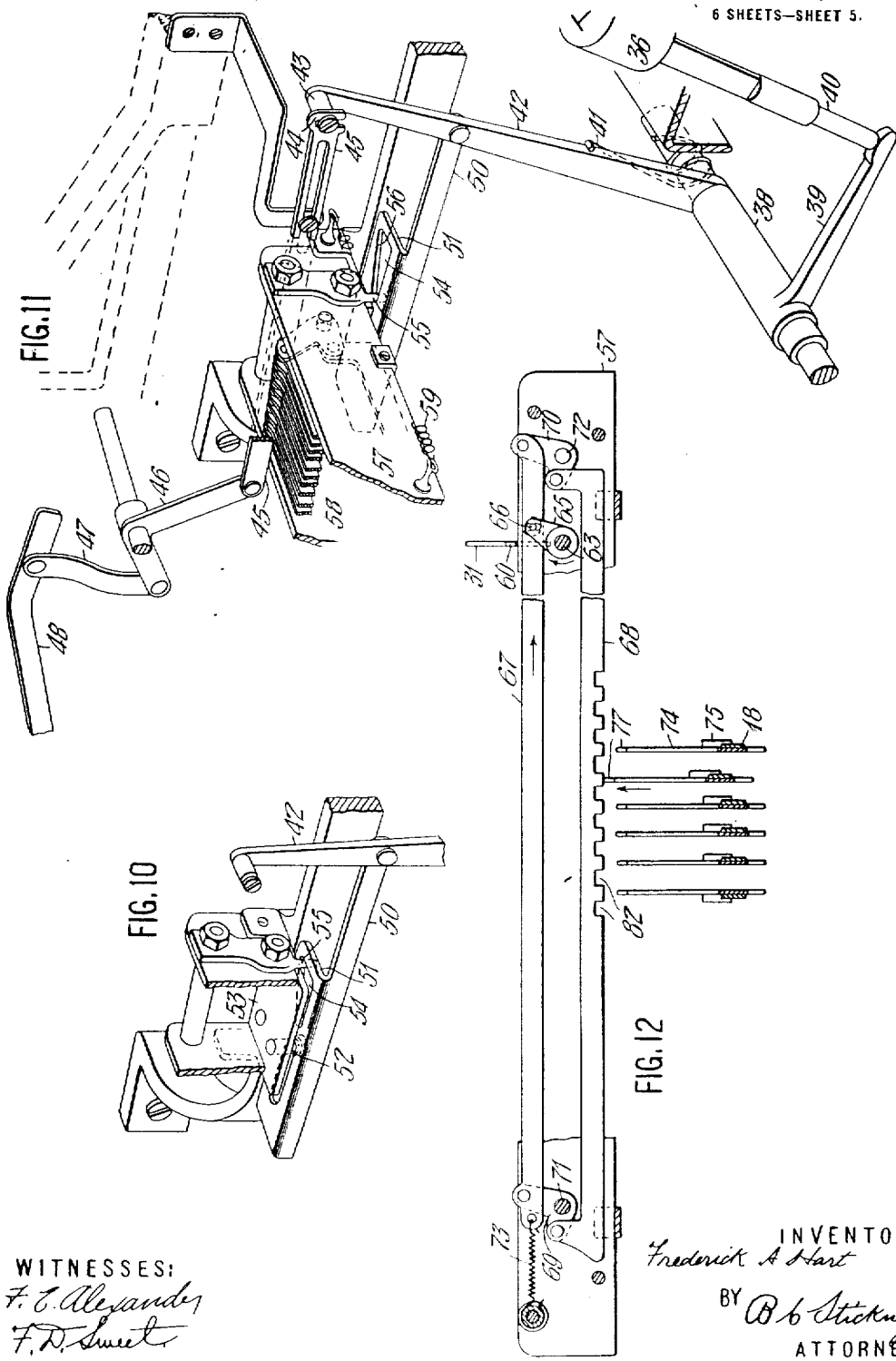

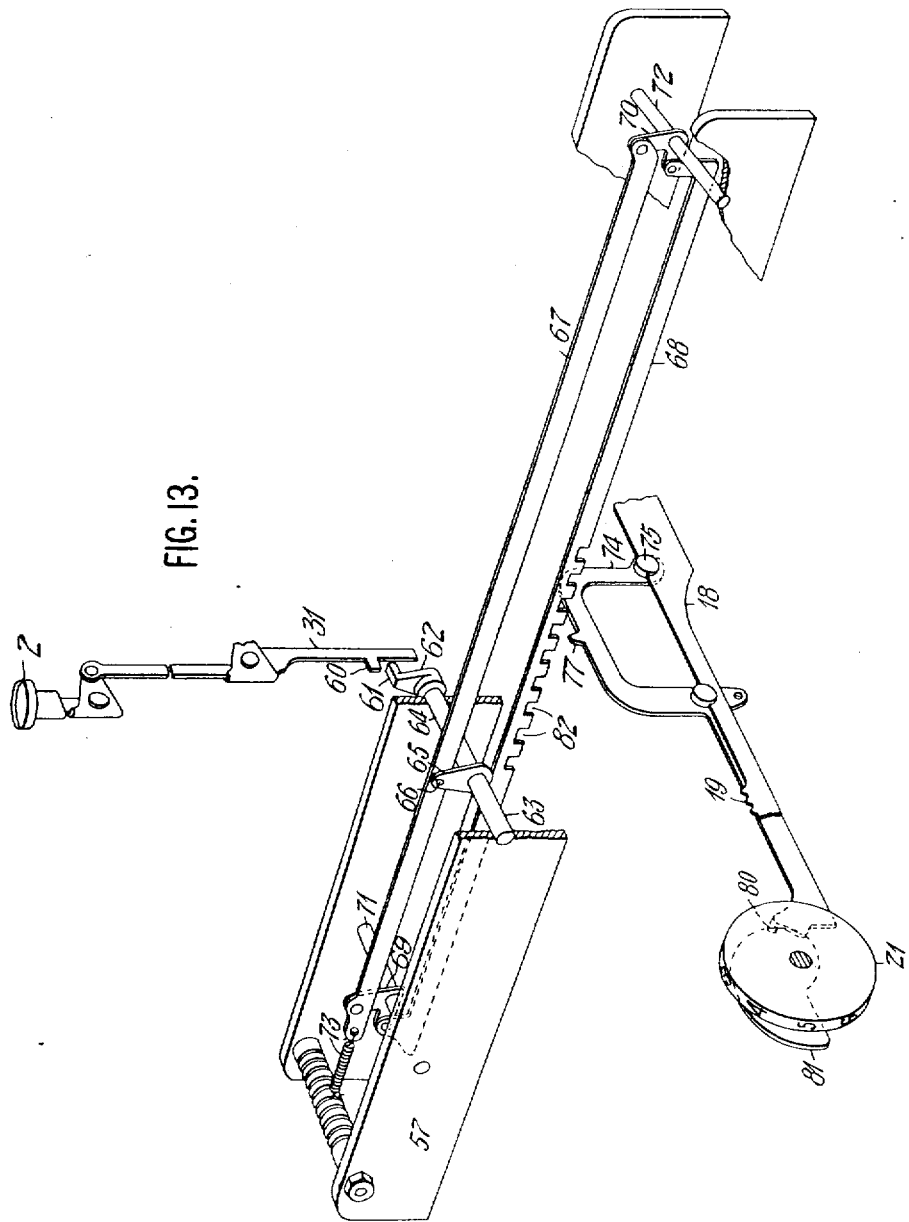

FREDERICK A. HART, OF JERSEY CITY, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPEWRITING AND COMPUTING MACHINE.

1,387,711. Specification of Letters Patent. Patented Aug. 16, 1921.

Application filed October 25, 1911. Serial No. 656,696.

*To all whom it may concern:*

Be it known that I, FREDERICK A. HART, a citizen of the United States, residing in Jersey City, in the county of Hudson and State of New Jersey, have invented certain new and useful Improvements in Combined Typewriting and Computing Machines, of which the following is a specification.

This invention relates to a combined computing and typewriting machine of the Underwood-Hanson type, such for instance as that shown in British Patent No. 3390 of 1912, and more particularly to a checking mechanism for preventing the total computed by the computing mechanism from being improperly transcribed by the typewriting mechanism.

In the combined computing and typewriter operation of an Underwood-Hanson machine, the sum of a series of numbers is added by the computing mechanism and shown up on the dial wheels, as they are written out on the work sheet by the typewriting mechanism. It is then necessary to read off this sum from the dial wheels, and write it on the work sheet with the typewriting mechanism. It has been possible for the typist, in transferring this number, to strike the wrong keys, and thus make an error in the result written on the work sheet.

It is therefore an object of this invention to prevent an error in transferring the sum computed by the computing mechanism and showing on the dial wheels, to the work sheet, by preventing the complete movement of all the numeral keys except the particular key which will strike the digit showing in the computing head in the particular denomination column being transcribed at that instant by the typewriting mechanism.

In the Underwood-Hanson combined computing and typewriting machine with which this invention is illustrated, the computation is accumulated in a series of computing or dial wheels of the computing head in such a manner that they show an aggregation of digits which represent the result of the particular mathematical problem being solved.

Before this number is transferred to the work sheet, the typist may press a special key which actuates a type bar to inscribe on the work sheet a special character, such as "T", before the number, which acts as a tell-tale, and certifies to the correctness of the result. If this character is lacking from the work sheet, it will show that the typist is depending on his memory in transcribing the result, and that this result is not mechanically certain.

The actuation of this certifying or telltale key brings into play the checking mechanism, which, as the carriage moves step-by-step for the individual columns, successively prevents the operative actuation of all of the numeral keys except the particular one corresponding to the digit set up and exhibited on the computing wheel corresponding to the denominational column which is being transcribed at that instant.

When the certifying key is actuated, it throws into the path of certain projections carried by all of the numeral keys, individual barriers or stops, which form interfering or locking mechanism to prevent the actuation of all of the numeral keys. These barriers or stops are shiftable separately and individually out of the path of said projections. To attain this feature, advantage is taken of the fact that the computing wheels have a different position for each of the digits, from "0" to "9," turned up or exhibited.

A spiral cam, connected to each computing or dial wheel, controls the position of a selecting permutation bar to correspond to its own position, so that each of these bars has a different position for each digit from "0" to "9." These permutation bars select which stop or barrier will be moved out of the path of the corresponding key, and thus select, in accordance with the number exhibited by the computing wheel, which key will be permitted to operate in the particular denominational column being transcribed from the computing head to the work sheet on the carriage. The permutation bars are carried by denominational column bars, which are actuated concomitantly with the movement of the carriage into the particular column to which they correspond, and to which the particular dial or computing wheel, showing the digit to be transcribed at that instant, corresponds.

It will thus be seen that the certifying key subordinates the typewriting mechanism to the computing mechanism, to the extent that the typewriting mechanism is subjected to control from the computing wheels, which individually exempt from interference a single key corresponding to the digit exhibited by itself.

The checking mechanism, which also amounts to an interfering or locking mechanism, after having once been brought into play by the certifying key, is secured so that it prevents the actuation of any but the proper numeral key, until it is released, which may be accomplished by clearing the computing wheels and returning them to zero through the actuation of the zero key, which concomitantly releases a latch, holding the checking mechanism in its active position.

Other features and advantages will hereinafter appear.

Referring to the drawings,

Figure 1 is a fragmentary view in side elevation, partly in section, to show the underlying structure.

Fig. 2 is a fragmentary top plan view, showing a portion of the checking mechanism and its relation to the column bars.

Fig. 3 is a fragmentary vertical section taken from right to left, showing the relation of the barrier or locking mechanism with the permutation selecting bars when the locking mechanism is in its effective position.

Fig. 4 is a fragmentary view of certain parts shown in Fig. 3, showing the locking or barrier mechanism in its ineffective normal position.

Fig. 5 is a fragmentary section taken at right angles to Figs. 3 and 4, showing the relation of the permutation selecting bars to the locking mechanism, with the column bars in their normal position at rest.

Fig. 6 is a view similar to Fig. 5, showing one of the column bars raised to cause the permutation selecting bar carried thereby to shift one of the barriers or stops out of its interfering position with respect to the corresponding projection carried by the corresponding numeral key.

Fig. 7 is a diagrammatic sectional view, showing the certifying or tell-tale key actuated to shift the locking mechanism to its effective position, and also to concomitantly actuate the type bar mechanism which prints the tell-tale character "T" on the work sheet on the platen.

Fig. 8 is a section on the line 8—8 of Fig. 5.

Fig. 9 is a fragmentary perspective view of one of the dial or computing wheels, showing a selecting bar-controlling cam carried thereby.

Figs. 10 and 11 are fragmentary perspective views, showing the mechanism for shifting the locking or barrier mechanism at the actuation of the certifying key, the former figure showing the locking mechanism shifter before operation, and the latter after operation.

Fig. 12 is a detail view, showing one of the barrier or stop-operating linkages operated by one of the permutation selecting bars, and corresponding to the position of the elements illustrated in Fig. 6.

Fig. 13 is a diagrammatic perspective view, showing the connection of several elements in one locking unit for one of the numeral keys.

Fig. 14 is a detail perspective view of one of the permutation bars for selecting the particular digit bar to be actuated.

Referring more particularly to the separate parts of this invention as embodied in the form shown in the drawings, 1 indicates letter keys, and 2 indicates numeral keys which are secured to key levers 3, which are so connected as to operate through the intermediary of the usual bell crank, the usual type bars, to strike against the front side of a platen 4 mounted to rotate on a carriage 5, which slides on one or more rails 6, under the impulse of a spring barrel 7 controlled in the usual way by the Underwood escapement mechanism indicated in general by 8. This escapement mechanism is of the usual type in which the carriage is fed step-by-step at letter-space intervals on the actuation of each of the typewriter keys 1 and 2. This typewriting mechanism controls the computing mechanism, indicated in general at 9, both from the numeral keys 2 and from the carriage 5. The latter form of control includes a series of tappets 10 arranged at intervals on a rack 11 carried by the carriage 5. The tappets 10 are so positioned that they will raise successively, as the carriage 5 moves step-by-step, a series of jacks 12, which are pivoted at 13, so as to depress their rear ends which operate wires 14 connected at their lower ends to levers 15 entering into the computing casing. The levers 15 each operate one of a series of linkages 16, each of which is provided with a pin 17 resting on the under side of one of a series of column rack bars 18. By this means the computing mechanism is controlled from the carriage, so as to synchronize the action of the computing mechanism with the step-by-step movement of the carriage, whereby the denominational columns of the digits written on the work sheet on the carriage will correspond to the denominational columns of the digits computed by the computing mechanism.

Each of the rack bars 18 is provided at its forward end with a rack 19 engaging a gear 20 connected by a pawl and ratchet mechanism, not shown, to a computing or dial wheel 21 forming one of a series in the computing head 22, so that a forward movement of any one of the rack bars 18 will rotate the corresponding dial wheel 21 a predetermined amount corresponding to the extent of movement of the rack bar, and will permit a return motion of the rack bar without a movement of the dial wheel. To determine the extent of movement of the column rack bars 18, they are each provided with a series of pins 23, which are capable of being set up, as by being depressed into the path of an operating bar 24. There is one of these pins for each of the numeral keys "1" to "9", so that as the bar 24 is given a movement of a definite extent toward the front of the machine, it will shift the bars 18 different amounts corresponding to the particular pin 23 projected in its path. This action is common in the Underwood-Hanson type of computing machine.

The bar 24 is connected to a general operator 25 having one or more rack bars 26, which mesh with gears 27 driven by a sector gear 28 on a shaft 29, which may be operated in any suitable manner, as by means of a crank 30, indicated in dotted lines in Fig. 1.

For the purpose of setting up the pins 23, each of the numeral keys 2 is provided with a stem 31 projecting down into the computing casing, and in the case of the numeral keys "1" to "9," projects down far enough to engage a crank 32 corresponding to a row of the pins 23, and connected to the corresponding one of a set of linkages 33. These linkages are operated at the depression of each of the numeral keys "1" to "9," in the manner common to the Underwood-Hanson machine, to depress the lower bar 34 of the corresponding linkage 33 below its fellows, so that it will depress the corresponding pin on the particular column bar 18, which is raised at that instant. The column bar raised corresponds to the column of the work sheet on the carriage, which will be written in by the typewriting mechanism at that instant. The mechanism so far described is common to the Underwood-Hanson machine, and forms no part of this invention, except as taken in combination with the new elements that coöperate therewith.

We now come to that portion of the description which relates more particularly to the present invention. If a computation has been carried on so that the computing or dial wheels 21 exhibited at the point 35 the result of the computation, it is necessary to transcribe this result from the computing mechanism to the work sheet on the platen 4. To enable this result to be transferred with mechanical certainty, there is provided a tell-tale or certifying key 36, which, when actuated, concomitantly causes the printing of a character on the work sheet on the carriage, which certifies to the correctness of the result, and actuates a checking mechanism which prevents the operation of all keys but the proper one at the several positions of the carriage in transcribing the result exhibited by the computing head 22.

In the mechanism shown to illustrate this invention, the stem of the certifying key 36 is normally held in its raised position by a spring 37, but is capable of being depressed against the tension of the spring, so that the lower end thereof will rock a bell crank lever 38, on one arm 39 of which the bottom of the stem 40 of the key 36 rests. The bell crank lever 38 is normally held in its unactuated position by a spring 41, which engages on the other arm 42 of the bell crank lever. Adjacent the upper end of the arm 42, there is provided a pin 43, which is engaged by a fork 44 of a slide bar 45. The other end of the slide bar 45 is connected to a bell crank lever 46, which in turn is connected by a link 47 to a lever 48, operating a bell crank 48ª which operates a certain type bar 49 carrying a tell-tale type character, such as the character "T," so that as the certifying or tell-tale key 36 is actuated, it will print the character "T" before the result of the computation is transcribed, which character will certify to the correctness of the result.

The operation of this type bar 49 is not the ultimate result of the actuation of the key 36, but merely incidental to show that the other mechanism operated by the key 36 has been brought into play before the transferring of the result of the computation to the work sheet. The other mechanism just mentioned, embodies a checking mechanism, which will prevent the operation of certain of the numeral keys 2 at different times. For this purpose, the arm 42 of the bell crank lever 38 is connected to a shifter 50, so as to operate the same. This shifter is shown in the form of a rod having a turned over plate 51 provided with a pin-and-slot connection 52, which limits and guides its movement, the pin being secured to a fixed portion of the frame, indicated at 53.

The plate 51 of the shifter 50 is also provided with a triangular slot 54, which is engaged by a pin 55, so that the inclined edge of this triangular slot, indicated at 56, will cam the pin 55 from the position indicated in Fig. 10 to the position indicated in Fig. 11. The pin 55 is carried by the frame 57 of a locking or interfering mechanism 58, so that this locking mechanism is shifted, against the tension of a spring 59, to a position such that it will thrust into the path of individual projections 60 carried by the stems 31, barriers or stops 61 carried by the locking mechanism 58. These barriers or stops 61 are shown in the form of cranks 62 secured on shafts 63, so as to form one element of a bell crank lever 64, whereby these barriers are capable of being individually rocked from an obstructing position in the path of the projections 60 to a position exempting corresponding projections from interference.

The bell cranks 64 of the barriers 61, of which there is one for each of the numeral keys from "0" to "9", have other arms 65, which are individually connected by a pin-and-slot connection 66 to one of a pair of parallelly moving bars or bails 67 and 68, which may be termed the "digit bars", in that they aid in controlling which digit key will be exempted from interference. There is one of these sets of bars for each digit key from "0" to "9" to correspond to the barriers or stops 61 which they operate.

The bars 67 and 68 are connected so as to move in parallel relation by being pivotally connected to the arms of bell crank levers 69 and 70, which are mounted on shafts 71 and 72 secured in the frame 57. The bars 67 and 68 are normally held in their positions spread farthest apart by a spring 73, so that the interfering barriers or stops 61 will be held in their interfering position, and the bars 68 will be held in their lowest positions.

Located subjacent the series of bars 68, and resting on the column bars 18 so as to be movable thereby, there are provided a plurality of permutation selecting bars 74, which are provided with pins 75 having grooves 76 cut therein, so as to permit them to slide on the column bars 18. It will be noted, by reference to Figs. 5, 6 and 14, that these permutation bars 74 are arched at one point, so as to bring a selecting tooth 77 on each bar in juxtaposition to one of the lower digit bars 68. The permutation bars 74 are normally held, by means of springs 78, in such a position that the tooth 77 thereon will be in opposition to the 0 digit bars 68, indicated in Figs. 5 and 6 by the numeral 79.

In order to shift the position of the permutation bars 74 so that the teeth thereon will correspond to some other of the digit bars 68, each of these permutation bars 74 is provided with a follower roller 80 which rests on a spiral cam 81 secured to each of the computing or dial wheels 21. Each of these cams 81 has a gradually increasing periphery in the form of a spiral, so that as the following roller 80 rests on the surface of the cam 81, and as the computing wheel is turned around to exhibit different digits, the permutation bars 74 will be shifted along the column bars 18, to occupy different positions corresponding to different ones of the digit bars 68.

Inasmuch as the lowest portion of the cam 81, in each instance, that is to say, the portion nearest the axis about which the computing wheels rotate, is located at such a point, with respect to the computing wheel, that the follower 80 will rest on this lowest point when the digit 0 is exhibited, then the tooth 77 will be opposite the digit bar 68, indicated at 79 in Figs. 5 and 6, which corresponds to the zero key. Similarly, as the computing wheels are rotated, the tooth 77, in each case, will be shifted an amount proportionate to the rotation of the wheel, so that the tooth 77 will be brought successively in opposition to the digit bar corresponding to the digit exhibited at the particular instant by the computing or dial wheel.

It will thus be seen that as each of the column bars is raised, through a step-by-step movement of the carriage, it will raise the permutation bar carried thereby, so that the tooth 77 will operate the digit bar 68 with which it is in opposition, which digit bar will correspond to the particular number or digit exhibited by the computing wheel which the particular column bar raised actuates.

Under normal conditions, before the certifying or tell-tale key 36 is actuated, the whole frame 57, and the interfering or locking mechanism carried thereby, is in its normal right hand position, so that grooves or play-ways 82 are in opposition to the teeth 77 on the permutation bars 74, permitting these teeth to play freely up and down as the column bars 18 are moved up and down, without actuating the lower digit bars 68, so that this interfering mechanism, forming part of the checking mechanism, is normally out of operation at this point, as well as at the point where the barriers 61 come in the path of the projections 60.

It is not desired that when the typist wishes to bring the certifying mechanism in play that it should be necessary for him to hold the key 36 in its depressed position. There is therefore provided a latch 83, which is normally held by a spring 84 in such a position that it will engage a projection or catch 85 on the frame 57 of the locking mechanism 58, whereby the interfering or locking mechanism will be held in its operative position corresponding to that illustrated in Figs. 3 and 11, until such time as it is desired to release the same, as for example, when the numeral indicated by the dial or computing wheel has been entirely and correctly transferred to the work sheet on the platen. At this time, there is no further use for the number exhibited by the dial wheels, and inasmuch as it is usually desired to return these computing wheels to zero for a subsequent computation, advantage is taken of this act to release the locking or interfering mechanism and return it to its normal inoperative position.

For this purpose, the zero key, indicated at 86, which operates to return the computing wheels 80 to their zero positions, as is common in the Underwood-Hanson computing and typewriting machine, is connected so that the lower end of the stem will rest on one arm of a bell crank lever 87, which is pivotally mounted intermediate its ends, and provided with a trip 88 which extends upwardly into engagement with the latch 83, and is connected thereto in such a manner as to trip said latch. The connection shown in this instance consists of a pin-and-slot connection 89, which will permit a limited movement of the zero key before the latch is unlocked. The locked position of this latch is shown in Fig. 3, and the unlocked position is shown in Fig. 4.

In the operation of the device, the numeral keys 2 are struck in any desired sequence to inscribe on the work sheet supported by the platen 4, the desired series of numbers. These keys actuate concomitantly the stems 31, so that they actuate the linkages 33 to cooperate with the column bars 18, so that the pins 23 are set up to correspond to the particular digit keys struck. The column bars 18 are raised successively in the usual manner to correspond to the movement of the carriage 5, and thus to the denominational columns on the work sheet. The numbers thus set up are accumulated on the computing or dial wheels 21 by the actuation of the general operator.

This operation may be repeated any number of times to add or subtract two or more numbers, so that when the desired computation is complete, the computing wheels 21 will exhibit a result which should be transferred to the work sheet on the carriage. Before transferring this resulting number, however, the operator will push the certifying key 36 which actuates the type bar 49 through the interconnecting linkages, so that it strikes rearwardly to impress a certifying character, such as the letter "T", on the work sheet in front of the resulting number to be transferred. When the tell-tale or certifying key 36 is thus depressed, it also slides the shifter 50 connected to the arm 42, so that the cam edge provided therein will slide the locking or interfering mechanism 58 to the left from the position indicated in Figs. 4 and 10 to the position indicated in Figs. 3 and 11.

The movement of the frame 57 toward the left brings each of the barriers or stops 61 beneath the corresponding projections 60 on the stems 31, so that the actuating movement of the keys 2 is prevented. This movement also brings the grooves or play-ways 82 in the lower bars 68 out of alinement with the teeth 77 on the permutation bars 74, so that these bars are no longer free to play up and down, without operating the digit bars 68 and 67. That is to say, the teeth between the play-ways 82 are brought above the teeth 77, so that any upward movement of the column bars 18, and thus of the permutation bars 74, will operate some one of the digit bars 68.

If we assume that the certifying key is depressed and the interfering mechanism has been moved to the left in its operative position as just described the typist now starts to transfer the numeral exhibited by the dial wheels 21 to the work sheet on the platen. One of the stops 10 on the rack 11 of the carriage 5 is so arranged that at this point in the work it will be located under the jack 12 corresponding to the first computing wheel 21, carrying an exhibited number, so that this jack will have been operated, so as to raise the first denominational column bar 18 to a position such that it will be above its fellows.

If we assume that this first computing wheel exhibits the numeral "4", the parts will be in the position shown in Figs. 5 and 6. It will be seen, by reference to these figures, that the tooth 77 has been shifted by the cam 81 to a position in opposition to the fifth (counting from the left) digit bar 68, inasmuch as the first digit bar corresponds to "0", the second to "1", the third to "2" and so on, the fifth digit bar will correspond to the digit "4".

It will thus be seen that when this column bar 18 is raised from the position indicated in Fig. 5 to the position indicated in Fig. 6, that the digit bars corresponding to the digit "4" will be actuated, as shown in Fig. 6, so that the barrier or stop 61, which is connected to this particular set of digit bars, will be rocked to the position shown in Fig. 12, so that it will lie out of the path of the corresponding projection 60, exempting this projection, and the numeral key "4" connected thereto, from interference, so that the numeral key "4" will be free to move its full range of play. If, at this particular instant, the operator should strike any other key but the numeral key "4," it will be seen that all of the other keys are barred or locked from movement, so that the operator would at once perceive that he had endeavored to transcribe the wrong digit, and would then make sure to strike the right key. When the right key, which, with the above assumption, would be the key "4," has been struck, the carriage would be fed a letter space step in the usual manner, so as to raise the next adjacent column bar 18 corresponding to the next letter space and the next computing wheel, whereby any digit key corresponding to the digit exhibited by this computing wheel would be selected for exemption from interference, while all of the other numeral keys would be locked against movement. It will thus be seen that the transference of the result exhibited by the dial or computing wheels 21 to the work sheet is mechanically certain, inasmuch as no other combination of digits can be transcribed on the work sheet. When the result has been completely taken down on the work sheet, the operator can then bring the mechanism back to its normal condition, freeing all of the numeral keys from interference, by pressing the zero key 86, which, at the same time that it returns the computing or dial wheels to zero, will trip the latch 83, permitting the spring 59 to return the interfering mechanism to the right, so that the barriers 61 are all moved out of alinement with the projections 60, and further, so that the playways 82 are brought in alinement with the teeth 77, permitting a free up and down movement of the column bars 18 and the permutation bars 74 carried thereby.

Variations may be resorted to within the scope of the invention, and portions of the improvements may be used without others.

Having thus described my invention, I claim:

1. In a combined typewriting and computing machine, the combination with typewriting mechanism including numeral types, of computing mechanism including denominational computation members, levers to operate said types and control said computing mechanism, and mechanism for controlling said typewriting mechanism from said computing mechanism, comprising devices whereby the action of said levers is governed by said computing mechanism, according to the position of said computation members.

2. The combination with typewriting mechanism, of computing mechanism controlled by said typewriting mechanism, a checking mechanism for subordinating said typewriting mechanism to said computing mechanism by subjecting the action of said typewriting mechanism to control from said computing mechanism, and controlling means for said checking mechanism, acting to certify to the identity of the result of the computation made by said computing mechanism and the amount written by said typewriting mechanism.

3. The combination with typewriting mechanism having numeral keys, of computing mechanism including members positionable to represent a number and controlled by said typewriting mechanism, and checking mechanism controlled from said members for inhibiting the operation of all but one of said keys.

4. The combination with typewriting mechanism having keys, of computing mechanism including members positionable to represent a number and controlled by said typewriting mechanism controlled from said members, and checking mechanism for inhibiting the operation of said keys.

5. The combination with typewriting mechanism, of computing mechanism controlled by said typewriting mechanism, a checking mechanism for subordinating said typewriting mechanism to said computing mechanism by subjecting the action of said typewriting mechanism to control from said computing mechanism, said checking mechanism being normally ineffective, and means for bringing said checking mechanism into operation.

6. The combination with typewriting mechanism, of computing mechanism controlled by said typewriting mechanism, a checking mechanism for subordinating said typewriting mechanism to said computing mechanism by subjecting the action of said typewriting mechanism to control from said computing mechanism; said checking mechanism being normally ineffective, and means for printing a character on a work-sheet, said means also bringing said checking mechanism into play.

7. The combination with a typewriting mechanism, of computing mechanism controlled by said typewriting mechanism, a checking mechanism normally ineffective for subordinating said typewriting mechanism to said computing mechanism by subjecting the action of said typewriting mechanism to control from said computing mechanism, means for bringing said checking mechanism into operation, and locking means for securing said checking mechanism in its effective position.

8. The combination with a typewriting mechanism, of computing mechanism controlled by said typewriting mechanism, a checking mechanism normally ineffective, for subordinating said typewriting mechanism to said computing mechanism by subjecting the action of said typewriting mechanism to control from said computing mechanism, means for bringing said checking mechanism into operation, locking means for securing said checking mechanism in its effective position, and means for concomitantly returning said computing mechanism to zero and releasing said locking means.

9. The combination with typewriting mechanism having numeral keys, of computing mechanism having computing wheels controlled by said keys, and checking mechanism controlled from said wheels for inhibiting the operation of said keys.

10. The combination with typewriting mechanism having a carriage and numeral keys, of computing mechanism having computing wheels, and checking mechanism controlled from said wheels and said carriage, for inhibiting the operation of said keys.

11. The combination with mechanism for running up a computation, of numeral keys for controlling said mechanism, computing wheels operated by said mechanism, and computing wheel controlled mechanism for controlling the operation of said keys.

12. The combination with setting mechanism for running up a computation, of numeral keys for controlling said mechanism, computing wheels operated by said mechanism, and having digits thereon to indicate a computation, and checking mechanism limiting the action of said keys to such as correspond to the digits exhibited by said computing wheels at the particular instants of actuation of said keys.

13. The combination with setting mechanism for running up a computation, of numeral keys for controlling said mechanism, computing wheels operated by said mechanism, inhibiting means for preventing the operation of said keys, and computing wheel controlling means for exempting from interference certain of said keys.

14. The combination with computing mechanism having numeral wheels, of numeral keys for controlling said mechanism, said wheels having digits thereon to indicate a computation, inhibiting means for preventing the operation of said keys, and means for controlling said inhibiting means to enable the operation of the numeral keys corresponding to the digits exhibited by said computing wheels at the instants of operation of said keys.

15. The combination with typewriting mechanism for writing digits in denominational columns, of computing mechanism including computing wheels to carry out a computation, keys for controlling both the printing of numbers and the computing of the same, said computing wheels exhibiting the result of said computation, each wheel corresponding to a certain denominational column, and checking means for preventing said typewriter mechanism, when actuated by any of said keys to write in a certain column, from printing any but the digit exhibited on the computing wheel corresponding to said column.

16. The combination with typewriting mechanism including a traveling carriage for writing digits in denominational columns, of computing mechanism, including computing wheels, to carry out a computation, keys for controlling both the printing of numbers and the computing of the same, said computing wheels for exhibiting the result of said computation, each wheel corresponding to a certain denominational column, and checking means for said keys under control of said carriage and wheels for preventing the actuation of any key but the one which will cause the printing of the digit corresponding to the one exhibited in the particular computing wheel corresponding to the column being written.

17. The combination with numeral keys, of computing mechanism controlled by said keys, selecting means for determining which of said keys may be operated, and locking means for locking those not to be operated.

18. The combination with typewriting keys and a traveling carriage, of computing mechanism controlled by said keys, locking mechanism for preventing the operation of said keys, and selecting means controlled by said carriage and actuating said locking mechanism to exempt certain of said keys from interference.

19. The combination with typewriting keys, of computing mechanism including numeral wheels controlled by said keys, locking mechanism for preventing the operation of said keys, and selecting means actuating said locking mechanism to exempt certain of said keys from interference, said wheels determining, by their position, the choice of said selecting means.

20. The combination with a plurality of keys, of locking mechanism for said keys, a key for controlling said locking mechanism, and a type bar operated by said last-mentioned key for printing a special character.

21. In a combined typewriting and computing machine, the combination with computing mechanism, of numeral keys controlling said mechanism, locking mechanism for said keys, a key for rendering said locking mechanism effective, a type-bar operated by said key for printing a special character, and means for setting said computing mechanism to zero and for rendering said locking mechanism ineffective.

22. The combination with a plurality of printing keys, of a carriage controlled by said keys for printing in different denominations, locking mechanism for said keys, preventing printing thereby except in a certain order, said locking mechanism being normally ineffective, and a key for rendering said locking mechanism effective.

23. The combination with a plurality of keys, of locking mechanism for preventing the movement of said keys, said locking mechanism being normally ineffective, a key for bringing said locking mechanism into play, and a type bar operated by said last-mentioned key, for printing a special character.

24. The combination with a plurality of keys, of projections carried by said keys, individual barriers movable concomitantly into the path of said projections, to prevent the movement of said keys, and means for selectively moving said barriers individually from the path of said projections.

25. The combination with a plurality of keys, of projections carried by said keys, individual barriers movable concomitantly into the path of said projections, to prevent the movement of said keys, means for moving all of said barriers simultaneously, and means for selectively removing said barriers individually from the path of said projections.

26. The combination with a plurality of keys, of stops for preventing the movement of said keys, means for manipulating said stops individually, and selecting bars for actuating said means.

27. The combination with a plurality of keys, of stops for preventing the movement of said keys, means for manipulating said stops individually, selecting bars for actuating said means, and computing wheels for determining the action of said selecting bars.

28. The combination with a plurality of keys, of stops for preventing the movement of said keys, means for manipulating said stops individually, selecting bars for actuating said means, and column bars for actuating said selecting bars.

29. The combination with a plurality of keys, of stops for preventing the movement of said keys, means for manipulating said stops individually, selecting bars for actuating said means, column bars for actuating said selecting bars and computing wheels for determining the action of said selecting bars.

30. The combination with typewriting mechanism, of locking mechanism for interfering with the operation of said typewriting mechanism, and means for manipulating said locking mechanism normally having an ineffective movement relative thereto.

31. The combination with typewriting mechanism, of locking mechanism for interfering with the operation of said typewriting mechanism, means for manipulating said locking mechanism normally having an ineffective movement relative thereto, and a key for causing the movement of said means to be effective to manipulate said locking mechanism.

32. The combination with typewriting mechanism, of locking mechanism for interfering with the operation of said typewriting mechanism, means for manipulating said locking mechanism normally having an ineffective movement relative thereto, a key for causing the movement of said means to be effective to manipulate said locking mechanism, and a type bar actuated by said key to strike a special character.

33. The combination with a carriage, of keys, locking mechanism for said keys, carriage-controlled means for operating said locking mechanism, computing wheels, and computing wheel controlled means determining the operation of said locking mechanism by said first-mentioned means.

34. The combination with a carriage, of keys, locking mechanism for said keys, carriage-controlled means for operating said locking mechanism, and selecting bars operative by said means for determining the operation of said locking mechanism by said means.

35. The combination with a carriage, of keys, locking mechanism for said keys, carriage-controlled means for operating said locking mechanism, selecting bars operative by said means for determining the operation of said locking mechanism by said means, and computing wheels determining, by their position, the position of said selecting bars.

36. The combination with a carriage, of keys, locking mechanism for said keys, carriage-controlled means for operating said locking mechanism, and a key for bringing said locking mechanism into play.

37. The combination with a carriage, of keys, locking mechanism for said keys, carriage-controlled means for operating said locking mechanism, and a key for causing said locking mechanism to be ineffective.

38. The combination with a carriage, of keys, locking mechanism for said keys, carriage-controlled means for operating said locking mechanism, a key for bringing said locking mechanism into play, and a key for causing said locking mechanism to be ineffective.

39. The combination with a plurality of keys, of individual barriers for interfering with the movement of said keys, digit bars for manipulating said barriers so as to exempt certain of said keys from interference, and means for operating said digit bars.

40. The combination with a plurality of keys, of individual barriers for interfering with the movement of said keys, digit bars for manipulating said barriers so as to exempt certain of said keys from interference, and selecting bars for operating said digit bars.

41. The combination with a plurality of keys, of individual barriers for interfering with the movement of said keys, digit bars for manipulating said barriers so as to exempt certain of said keys from interference, and selecting bars for operating said digit bars; means being provided to admit of an ineffective movement of said selecting bars relative to said digit bars.

42. The combination with a plurality of keys, of individual barriers for interfering with the movement of said keys, digit bars for manipulating said barriers so as to exempt certain of said keys from interference, and selecting bars for operating said digit bars; said digit bars having play-ways into which said selecting bars can move without affecting said digit bars.

43. The combination with a plurality of keys, of individual barriers for interfering with the movement of said keys, digit bars for manipulating said barriers so as to exempt certain of said keys from interference, selecting bars for operating said digit bars; said digit bars having play-ways into which said selecting bars can move without affecting said digit bars, and means for shifting said digit bars to remove said play-ways from opposition to said selecting bars, so that the movement of said selecting bars will be effective to operate said digit bars.

44. The combination with a plurality of keys, of individual barriers for interfering with the movement of said keys, digit bars for manipulating said barriers so as to exempt certain of said keys from interference and selecting bars for operating said digit bars; said selecting bars having individual teeth projecting beyond the body of the bar, so as to engage individually a single digit bar.

45. The combination with a plurality of keys, of individual barriers for interfering with the movement of said keys, digit bars for manipulating said barriers so as to exempt certain of said keys from interference, and selecting bars for operating said digit bars; said selecting bars having individual teeth projecting beyond the body of the bar, so as to engage individually a single digit bar; said digit bars having play-ways admitting of an ineffective movement of said teeth with respect to said selecting bars.

46. The combination with a plurality of keys, of individual barriers for interfering with the movement of said keys, digit bars for manipulating said barriers so as to exempt certain of said keys from interference, selecting bars for operating said digit bars; said selecting bars having individual teeth projecting beyond the body of the bar, so as to engage individually a single digit bar; said digit bars having play-ways admitting of an ineffective movement of said teeth with said selecting bars; said digit bars being normally in a position with said play-ways in opposition to said teeth, and means for bringing said play-ways out of opposition with said teeth, so that said selecting bars will operate said digit bars.

47. The combination with a plurality of keys, of individual barriers for interfering with the movement of said keys, digit bars for manipulating said barriers so as to exempt certain of said keys from interference, selecting bars for operating said digit bars; said selecting bars having individual teeth projecting beyond the body of the bar, so as to engage individually a single digit bar; said digit bars having play-ways admitting of an ineffective movement of said teeth with said selecting bars; said digit bars being normally in a position with said play-ways in opposition to said teeth, means for bringing said play-ways out of opposition with said teeth, so that said selecting bars will operate said digit bars, and means for returning said digit bars to their normal positions.

48. The combination with a plurality of keys, of individual barriers for interfering with the movement of said keys, digit bars for manipulating said barriers so as to exempt certain of said keys from interference, selecting bars for operating said digit bars; said selecting bars having individual teeth projecting beyond the body of the bar, so as to engage individually a single digit bar; said digit bars having play-ways admitting of an ineffective movement of said teeth with said selecting bars; said digit bars being normally in a position with said play-ways in opposition to said teeth, means for bringing said play-ways out of opposition with said teeth, so that said selecting bars will operate said digit bars, means for returning said digit bars to their normal positions, and a key for controlling the movement of said digit bars.

49. The combination with a plurality of numeral keys, of barriers for interfering with the movement of said numeral keys, digit bars for shifting said barriers, selecting bars for operating said digit bars, and computing wheels for controlling the action of said selecting bars.

50. The combination with a plurality of numeral keys, of barriers for interfering with the movement of said numeral keys, digit bars for shifting said barriers, selecting bars for operating said digit bars, computing wheels, a cam connected to each of said computing wheels, and a follower connected to each of said selecting bars and engaging corresponding cams on said computing wheels, whereby said computing wheels determine the action of said selecting bars.

51. The combination with a plurality of numeral keys, of barriers for interfering with the movement of said numeral keys, digit bars for shifting said barriers, selecting bars for operating said digit bars, computing wheels, a cam connected to each of said computing wheels, a follower connected to each of said selecting bars and engaging corresponding cams on said computing wheels, whereby said computing wheels determine the action of said selecting bars, said selecting bars being normally ineffective to operate said digit bars, and a key control for causing an effective operation of said digit bars by said selecting bars.

52. The combination with a plurality of numeral keys, of barriers for interfering with the movement of said numeral keys, digit bars for shifting said barriers, selecting bars for operating said digit bars, computing wheels, a cam connected to each of said computing wheels, a follower connected to each of said selecting bars and engaging corresponding cams on said computing wheels, whereby said computing wheels determine the action of said selecting bars, said selecting bars being normally ineffective to operate said digit bars, a key control for causing an effective operation of said digit bars by said selecting bars, and a latch for holding said digit bars in their operative relation with respect to said selecting bars.

53. The combination with a plurality of numeral keys, of barriers for interfering with the movement of said numeral keys, digit bars for shifting said barriers, selecting bars for operating said digit bars, computing wheels, a cam connected to each of said computing wheels, a follower connected to each of said selecting bars and engaging corresponding cams on said computing wheels, whereby said computing wheels determine the action of said selecting bars, said selecting bars being normally ineffective to operate said digit bars, a key control for causing an effective operation of said digit bars by said selecting bars, a latch for holding said digit bars in their operative relation with respect to said selecting bars, and a key for releasing said latch.

54. The combination with a plurality of keys, of locking mechanism for said keys, computing wheels, a cam on each of said computing wheels having a definite arrangement relative to each computing wheel, and connections between said cams and said locking mechanism, whereby the position of said computing wheels will determine which of said keys will be locked by said locking mechanism.

55. The combination with a plurality of keys, of locking mechanism for said keys, a pin connected to said locking mechanism, a shifter having a cam slot therein through which said pin extends, and means for manipulating said shifter, whereby said cam slot will operate said locking mechanism through the intermediary of said pin.

56. The combination with a plurality of keys, of projections carried by said keys, a plurality of barriers for engaging with said projections to interfere with the movement of said keys, digit bars for operating said barriers individually, and a shifter for bringing all of said barriers into the path of said projections.

57. The combination with a plurality of keys, of projections carried by said keys, a plurality of barriers for engaging with said projections to interfere with the movement of said keys, digit bars for operating said barriers individually, a shifter for bringing all of said barriers into the path of said projections; said digit bars being connected in pairs so as to move in parallel relation, and the lower bar of each pair having a plurality of play-ways therein, and means for manipulating said bars normally located opposite said play-ways.

58. The combination with a key, of a projection carried by said key, a barrier movable into the path of said projection, to interfere with the operation of said key, an arm connected to said barrier so as to shift said barrier out of the path of said projection, a bar connected to said arm, a bar connected to said first-mentioned bar and having a plurality of play-ways therein, and a permutation bar normally moving ineffectively in said play-ways.

59. The combination with a key, of a projection carried by said key, a barrier movable into the path of said projection, to interfere with the operation of said key, an arm connected to said barrier so as to shift said barrier out of the path of said projection, a bar connected to said arm, a bar connected to said first-mentioned bar and having a plurality of play-ways therein, a permutation bar normally moving ineffectively in said play-ways, and a shifter for moving said first and second mentioned bars so that said permutation bar may operate said second-mentioned bar by engagement therewith.

60. The combination with a plurality of numeral keys, of mechanism for rendering any or all of said keys ineffective, and means for determining which of said keys shall be effective, said determining means including a denominational selecting device.

61. The combination with a plurality of numeral keys, of mechanism for rendering any or all of said keys ineffective, selecting means, computing wheels, and means controlled by said computing wheels and said selecting means for rendering said keys effective.

62. The combination with numeral keys, of barriers for interrupting the movement of said numeral keys, digit bars for shifting said barriers, certain of said digit bars having teeth thereon spaced apart from each other, and selecting permutation bars cooperating with said teeth, to manipulate said digit bars, whereby said barriers may be shifted.

63. The combination with numeral keys, of barriers for interrupting the movement of said numeral keys, digit bars for shifting said barriers, certain of said digit bars having teeth thereon spaced apart from each other, selecting permutation bars cooperating with said teeth, to manipulate said digit bars whereby said barriers may be shifted, said digit bars being normally located so that said teeth are out of cooperative juxtaposition to said selecting bars, and means for shifting said digit bars so that said teeth will be located in coöperative juxtaposition to said selecting bars.

64. The combination with a computing mechanism, of numeral keys for controlling the action of said computing mechanism, and locking means for predetermining that only a certain numeral key shall act when working in a certain column.

65. The combination with a computing mechanism arranged to accumulate a computation, of a typewriting mechanism including numeral types operable to print a number digit by digit on a work-sheet, and means for insuring the exact transcription, on the work-sheet, of a number exhibited by the computing mechanism, comprising mechanism acting to render the numeral types mechanically dependent on said computing mechanism during the transcription.

66. The combination with a plurality of keys, of a series of barriers, one for each of said keys, for opposing the movement of said keys, and means for selectively removing said barriers out of obstructing position with respect to said keys, to enable a selected movement of certain of said keys while opposing the movement of certain others of said keys.

67. The combination with a series of keys, of locking mechanism for opposing the movement of said keys, and selecting means for enabling the successive movement of individual keys solely, according to a predetermined sequence.

68. The combination with a plurality of numeral keys, of locking mechanism for said keys normally ineffective, so as to enable the action of any of said keys in any desired order, shifting means for bringing said locking mechanism into play, so as to oppose the movement of all of said keys, and selecting mechanism for manipulating said locking mechanism, to permit individual movements of said keys, while preventing the movement of all other keys, according to a definite predetermined arrangement.

69. The combination with a computing mechanism arranged to run up a computation, of a typewriting mechanism for inscribing on a work-sheet the numbers of the computation, a single set of numeral keys for actuating both said computing mechanism and said typewriting mechanism, locking means for insuring the exact transcription of a number exhibited by said computing mechanism to said work-sheet by said typewriting mechanism, and means brought into play concomitantly with said locking means, to inscribe on said work-sheet a telltale character, denoting that the exact transposition of the number from said computing mechanism to said work-sheet has been insured.

70. The combination with a series of dial wheels arranged to exhibit a computation of numbers, of numeral keys controlling the computing of numbers on said wheels, means for locking said keys, and selecting means, for controlling said locking means, occupying variable positions corresponding with the numerals exhibited by said wheels.

71. The combination with a dial wheel, of a column bar for actuating said dial wheel to exhibit various numbers, a cam carried by said dial wheel graduated according to the arrangement of the digits on said dial wheel, a digit-selecting bar slidably mounted on said column bar and actuated by said cam, and a locking mechanism actuated by said digit-selecting bar on a movement of said column bar.

72. The combination with a computing mechanism having a series of computing wheels adapted to exhibit digits of a computation, of numeral keys for controlling the rotation of said computing wheels, and checking mechanism controlled by the rotary position of said wheels for inhibiting the operation of certain of said keys.

73. The combination with a typewriting mechanism having a traveling carriage and a series of numeral keys, of a computing mechanism having a series of computing wheels adapted to exhibit the digits of a computation, and checking mechanism controlled by the successive positions of said carriage for inhibiting the operation of keys discordant with the digit exhibited by the wheel registering with the printing point as determined by said carriage.

74. The combination with a typewriting mechanism having a traveling carriage and numeral keys, of a computing mechanism having computing wheels and adapted to exhibit the digits of a computation, and checking mechanism controlled by the rotary position of said wheels and the position of said carriage for inhibiting the operation of certain of said keys.

75. The combination with a computing mechanism having a series of computing wheels, of a series of numeral keys for controlling the rotation of said computing wheels, said computing wheels being adapted to exhibit the digits of a computation, and checking mechanism controlled by said wheels for locking some of said numeral keys.

76. The combination with a computing mechanism having a series of computing wheels adapted to exhibit the digits of a computation, of a series of numeral keys for controlling the rotation of said computing wheels to exhibit the digits, and checking mechanism controlled by said computing wheels for locking all keys discordant with the several digits exhibited by said computing wheels.

77. The combination with a computing mechanism arranged to exhibit the digits of a computation, of typewriting mechanism for writing the digits as computed, numeral keys common to said typewriting mechanism and said computing mechanism for controlling the writing of the digits and the computing of the digits, and means for insuring the correct transcription of the computation comprising silencing means for debarring the operative from writing digits other than those exhibited by the computing mechanism.

78. The combination with a typewriting mechanism including a carriage, of computing wheels, numeral keys controlling both said typewriting mechanism and said wheels, and means for controlling the numeral keys of the typewriting mechanism from the typewriter carriage around through the computing wheels.

79. The combination with computing mechanism arranged to exhibit the result of a computation, of digit printing mechanism operable to print the result of the computation as thus exhibited, and means for insuring the correct printing of the result exhibited, comprising devices for disabling the printing mechanism and for enabling denomination by denomination the proper digit printing mechanism as the digits of a number are printed.

80. The combination with computing mechanism, including computing wheels and denomination-selecting mechanism for selecting for operation said wheels denomination by denomination, means for transcribing the result of a computation, and means controlling said transscribing means acting through the medium of said computing wheels and said denomination-selecting mechanism for insuring the transcribing of a digit exhibited by a computing wheel in the denomination in which it is exhibited.

81. The combination with denominational computation members, positionable to represent a number, of a single set of types common to the several denominational orders of said members, means for actuating said types to print, and means coördinating said compution members and said actuating means for insuring the printing by said types of the numbers as represented by said members.

82. In a combined typewriting and computing machine, the combination with typewriting mechanism, including numeral printing types, of computing mechanism having computation members, and mechanism controlled from said members for determining the order in which said numeral types shall be operated to print.

83. In a combined typewriting and computing machine, the combination with typewriting mechanism, including numeral printing types and means for actuating said types to print, of computing mechanism having computation members, cams carried by said members, and connections controlled by said cams to determine the order of operation of said types to print by said actuating means.

84. The combination, with a typewriting machine, of a computing device including a series of cams, a series of bars positioned by said cams, and means for actuating said bars to control the operation of the numeral key levers of the typewriter.

85. The combination, with a typewriting machine and a computing device controlled by the numeral keys thereof, of a series of bails to control the numeral type bars, a series of cams controlled according to the dials of the computer, and connecting mechanism between the cams and the bails.

86. The combination, with a typewriting machine, of a computing device controlled by the numeral keys of the typewriting machine, a series of bails to control the respective key levers of the numeral keys, a series of cams connected with the dial wheels of the computer, bars extending transversely of the bails, mechanism controlled by the cams for controlling the position of the bars, and mechanism for operating said bars to operate the bails and thereby control the operation of the key levers and type bars.

87. The combination of a typewriting machine, a computing device connected therewith, a series of bails to control the key levers of the typewriting machine, a series of bars transverse of the bails and adapted to act on any of them, mechanism connected with the computing device for positioning the bars, and mechanism for operating the bars.

88. The combination of a typewriting machine, a computing device connected therewith, a series of bails to control the numeral key levers of the typewriter, a series of transverse bars, any of which may be connected with any bail, and positioning mechanism between each bar and the corresponding dial of the computer.

89. In a calculating machine, the combination of a set of numeral printing bars, a set of displaceable elements, and mechanism to control the operation of said bars successively in a sequence determined by the position of said displaceable elements.

90. In a calculating machine, the combination of a set of numeral printing bars, a set of number wheels, a set of displaceable elements positively connected to said number wheels, and mechanism for controlling the operation of said bars successively in a sequence determined by said displaceable elements.

91. In a calculating machine, the combination of a set of numeral printing bars, a totalizer including a set of displaceable elements, and mechanism for controlling the operation of said bars successively in a sequence determined by the position of said displaceable elements.

92. In a calculating machine, the combination of a set of displaceable elements, printing means including a single set of figure types, and automatic mechanism for bringing said printing means under the control of said displaceable elements *seriatim* whereby the number represented by said set of displaceable elements may be printed by said single set of type.

93. In a calculating machine, the combination of a set of displaceable elements, carrying mechanism connecting said displaceable elements, printing means provided with a single set of figure types and automatic mechanism for bringing said printing means under the control of said displaceable elements *seriatim*, whereby the total represented by said set of displaceable elements may be printed by said single set of type.

94. The combination of a set of independently settable computation devices, a series of numeral type-bars, means for operating said type-bars, and type-bar selecting devices controlled by said computation devices.

95. The combination with a set of numeral types and a set of numeral keys, of a series of computation wheels, means to enable each wheel to select that key which corresponds to the rotative position of the wheel, and means for enabling the successive operation, beginning with the highest denomination, of the selected keys, to cause the types to print the number which is set up on the wheels.

96. The combination with a typewriting mechanism writing character by character, of a computing mechanism coöperating with said typewriting mechanism to compute the digits of numbers printed by said type-writing mechanism and eventually exhibit the resultant of a computation, and mechanism for said typewriting mechanism operating under the control of said computing mechanism so as to prevent an incorrect copying of the resultant exhibited by said computing mechanism.

97. The combination with computing mechanism arranged to exhibit the resultant of a computation, of type actions for printing numbers digit by digit, and selective means for automatically controlling the operation of said type actions according to a predetermined sequence determined by said computing mechanism.

98. The combination with typewriting mechanism including numeral types printing digit by digit in successive denominations, the digits of a number, of computing mechanism for computing and eventually exhibiting the resultant of all of the digits written by said numeral types, said computing mechanism including dial wheels, each arranged to exhibit one digit of the resultant, actuating means for operating said numeral types, and selecting means for enabling the operation of said numeral types by said actuating means in an order of succession predetermined by the digits exhibited by said dial wheels when printing in the denominations corresponding to said dial wheels.

99. In a computing machine, the combination with a gang of computing wheels, of a selecting bar controlled by each computing wheel, a series of links to be selected by the selecting bars, a bell-crank at each end of each link so that said links swing parallel to themselves, and a tie connecting the other arm of each pair of bell-cranks for causing the two ends of each link to move in unison.

100. In a computing machine, the combination with a gang of computing wheels, of a selecting bar controlled by each computing wheel, a series of links to be selected by the selecting bars, a bell-crank at each end of said links so that said links swing parallel to themselves, and a tie connecting the other arm of each pair of bell-cranks for causing the two ends of each link to move in unison, each selecting bar comprising a head engaged and moved by the corresponding computing wheel.

101. The combination, with a typewriting machine and a computing device connected with the numeral keys thereof, of a series of bails connected with the numeral type-bars, a series of cams controlled according to the dials of the computer, and connecting mechanism between the cams and the bails.

102. The combination of a typewriting machine, a computing device connected therewith, a series of bails connected with the key-levers of the typewriting machine, a series of bars transverse of the bails and adapted to act on any of them, mechanism connected with the computing device for positioning the bars, and mechanism for operating the bars.

103. The combination of a typewriting machine, a computing device connected therewith, a series of bails connected with the numeral key-levers of the typewriter, a series of transverse bars, any of which may be connected with any bail, and positioning mechanism between each bar and the corresponding dial of the computer.

104. The combination of a typewriting machine, a computing device connected therewith, a series of bails connected with the numeral key-levers of the typewriter, a series of transverse bars, any of which may be connected with any bail, a series of cams connected with the respective dials of the computer, and mechanism for shifting the bars connected with said bails and said cams.

105. The combination of a typewriting machine, a computing device connected therewith for operation by the numeral keys of the typewriter, a series of bails connected with the respective numeral key bars of the typewriter, a series of bars extending transversely of the bails, positive connections for positioning said bars, a series of cams connected with the computing device for actuating said positive connections, and mechanism for operating the positioned bars.

FREDERICK A. HART.

Witnesses:
GLENFIELD S. YOUNG,
C. RIPLEY.